United States Patent
Moore et al.

(10) Patent No.: US 9,344,562 B2
(45) Date of Patent: May 17, 2016

(54) APPARATUS AND METHOD FOR MANAGING INTERACTIVE TELEVISION AND VOICE COMMUNICATION SERVICES

(71) Applicant: AT&T Intellectual Property I, LP, Atlanta, GA (US)

(72) Inventors: Darryl Cynthia Moore, Social Circle, GA (US); Burt Joseph Bossi, Indianapolis, IN (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 262 days.

(21) Appl. No.: 13/690,879

(22) Filed: Nov. 30, 2012

(65) Prior Publication Data
US 2014/0153705 A1 Jun. 5, 2014

(51) Int. Cl.
| | |
|---|---|
| *H04M 11/00* | (2006.01) |
| *H04M 3/42* | (2006.01) |
| *H04M 1/247* | (2006.01) |
| *H04N 7/173* | (2011.01) |
| *H04N 21/41* | (2011.01) |
| *H04N 21/478* | (2011.01) |
| *G10L 15/26* | (2006.01) |

(52) U.S. Cl.
CPC ........ *H04M 3/42391* (2013.01); *H04M 1/2475* (2013.01); *H04N 7/173* (2013.01); *H04N 21/4126* (2013.01); *H04N 21/478* (2013.01); *G10L 15/26* (2013.01)

(58) Field of Classification Search
CPC ...................................................... H04M 3/436
See application file for complete search history.

(56) References Cited

U.S. PATENT DOCUMENTS

| | | | |
|---|---|---|---|
| 5,375,160 A | 12/1994 | Guidon | |
| 6,075,842 A | 6/2000 | Engelke | |
| 6,233,314 B1 | 5/2001 | Engelke | |
| 6,411,685 B1 * | 6/2002 | O'Neal | 379/88.14 |
| 6,504,910 B1 | 1/2003 | Engelke | |
| 6,882,709 B1 * | 4/2005 | Sherlock et al. | 379/90.01 |
| 7,515,698 B2 * | 4/2009 | Van Wyk | H04M 1/575 379/142.01 |
| 7,660,398 B2 | 2/2010 | Engelke | |
| 7,881,441 B2 | 2/2011 | Engelke | |
| 8,099,750 B2 * | 1/2012 | Howarter | G08B 27/008 725/116 |
| 8,213,578 B2 | 7/2012 | Engleke | |
| 8,254,535 B1 * | 8/2012 | Madhavapeddi | H04M 3/493 379/88.14 |

(Continued)

OTHER PUBLICATIONS

CapTel, "How CapTel Works", http://www.captel.com/how-it-works.hph; Nov. 2, 2012.

(Continued)

*Primary Examiner* — Joseph T Phan
(74) *Attorney, Agent, or Firm* — Guntin & Gust, PLC; Douglas Schnabel

(57) ABSTRACT

A system, process and computer-readable media that incorporate teachings of the subject disclosure may include, for example, an interactive application delivering captions of an audio signal, such as a voicemail message or audio received concurrently during a telephone conversation. The application can be a television application, for example, receiving at a media processor associated with equipment of a first party, a textual interpretation of an audio signal of a second party, for example, during an active telephone call between the first party and the second party. A graphical image of the textual interpretation of the audio signal is rendered at the media processor and presented to a display device, such as a television display. Other embodiments are disclosed.

20 Claims, 7 Drawing Sheets

(56) References Cited

U.S. PATENT DOCUMENTS

| | | | | |
|---|---|---|---|---|
| 8,266,664 B2* | 9/2012 | Qiu | | H04L 12/58 |
| | | | | 379/88.14 |
| 8,665,075 B2* | 3/2014 | Pratt | | G08C 17/02 |
| | | | | 340/12.1 |
| 8,682,981 B2* | 3/2014 | McCarthy | | H04L 12/587 |
| | | | | 709/206 |
| 8,745,680 B2* | 6/2014 | Brandt et al. | | 725/106 |
| 9,083,564 B2* | 7/2015 | McCarthy | | H04L 12/66 |
| 2004/0028191 A1 | 2/2004 | Engelke | | |
| 2005/0027539 A1* | 2/2005 | Weber et al. | | 704/275 |
| 2008/0109839 A1* | 5/2008 | Bruce et al. | | 725/25 |
| 2008/0187108 A1 | 8/2008 | Engelke | | |
| 2009/0307267 A1 | 12/2009 | Chen | | |
| 2009/0326939 A1* | 12/2009 | Toner | | H04M 1/656 |
| | | | | 704/235 |
| 2010/0323728 A1 | 12/2010 | Gould | | |
| 2011/0170672 A1 | 7/2011 | Engelke | | |
| 2012/0250836 A1 | 10/2012 | Engleke | | |
| 2013/0058471 A1* | 3/2013 | Garcia | | H04M 3/42221 |
| | | | | 379/202.01 |

OTHER PUBLICATIONS

WebCapTel , "WebCapTel/Mobile", http://www.captel.com/webcaptel; Nov. 2, 2012.

* cited by examiner

200

APPARATUS AND METHOD FOR MANAGING INTERACTIVE TELEVISION AND VOICE COMMUNICATION SERVICES

FIELD OF THE DISCLOSURE

The subject disclosure relates to an apparatus and method for managing interactive television and voice communication services.

BACKGROUND

Participating in telephone conversations can be challenging if not impossible for the hearing impaired. One service presently available for supporting participation of the hearing impaired in such telephone conversations is referred to as CAPTEL, commercially available from Ultratech, of Madison, Wis. Under such services, the audio portion of a second party participating in a telephone conversation with a first, hearing-impaired party is routed to an operator, for example, by way of a conference relay or voice communications bridge. Such services generally require that a second party initiating a telephone call to a first party contact the first party through a telephone number provided by an operator, rather than by the first party's own telephone number.

The call is directed to the operator by way of the telephone number provided. The operator re-voices the second party's audio for translation by a speech-to-text application. The resulting text, referred to as captioned audio, is routed from the operator to the first party for presentation on a special telephone device including a text display screen. Another application allows for similar display of captioned audio by way of a web application.

BRIEF DESCRIPTION OF THE DRAWINGS

Reference will now be made to the accompanying drawings, which are not necessarily drawn to scale, and wherein.

DETAILED DESCRIPTION

Figure 1:
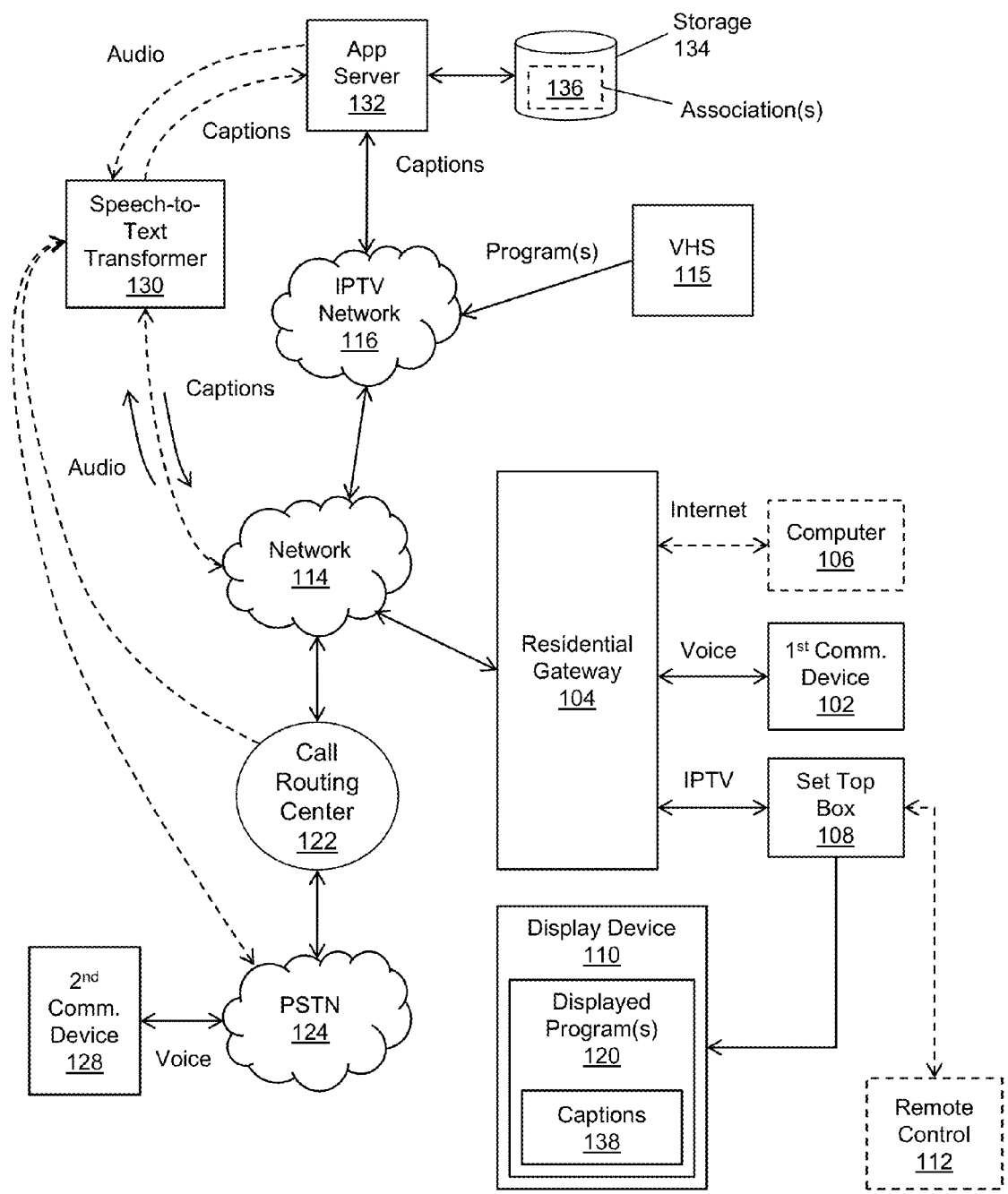
FIG. 1 depicts an illustrative embodiment of a system that delivers captioned audio of an active telephone conversation on a television display.

The subject disclosure describes, among other features, illustrative embodiments of an interactive television application that concurrently delivers captioning for audio, such as an active telephone conversation between a first party and second party or pre-recorded voice messages, for example, from a voice mailbox. The captioned audio is delivered to a display device, such as a television display, by way of a media processor associated with equipment of a user. A graphical image of the captioned audio is rendered at the media processor and presented to the display device. Other embodiments are included in the subject disclosure.

One embodiment of the subject disclosure is related to a process including receiving, by a system including a processor, an indication of establishment of an audio signal. An offer to receive a textual interpretation of the audio signal is presented by the system to a television display. The television display is associated with a first party. The textual interpretation of the audio signal is received by the system in response to acceptance of the offer. The textual interpretation of the audio signal is received from an application server. A graphical image of the textual interpretation of the audio signal is rendered for presentation by the television display. The graphical image of the textual interpretation of the audio signal is presented, by the system, to the television display.

Another embodiment of the subject disclosure is related to a media processing device including a memory to store computer instructions and a processor coupled to the memory. The processor, responsive to executing the computer instructions, performs operations including receiving, during an active telephone call between a first party and a second party, a textual interpretation of an audio signal generated by equipment of the second party. The textual interpretation of the audio signal is received from an application server. A graphical image is rendered of the textual interpretation of the audio signal generated during the active telephone call by the equipment of the second party. The graphical image of the textual interpretation of the audio signal generated during the telephone call by the equipment of the second party is presented to a television display associated with a caller identification of the first party.

Yet another embodiment of the subject disclosure includes a computer-readable storage medium, comprising computer instructions which, responsive to being executed by a processor, cause the processor to perform operations comprising: receiving, during an active telephone call between a first party and second party, a textual interpretation of an audio signal generated by equipment of the second party. The textual interpretation of the audio signal is received from an application server. A graphical image is rendered of the textual interpretation of the audio signal generated during the active telephone call by the equipment of the second party. The graphical image of the textual interpretation of the audio signal generated during the telephone call by the equipment of the second party is presented to a display device associated with a caller identification the first party.

FIG. 1 depicts an illustrative embodiment of an interactive multimedia system 100 that delivers a textual representation of an audio signal, referred to generally as captioning. The audio signal can be obtained from one or more sources, such as a telephone conversation or a pre-recorded voice message. The captioning is delivered to a television display device 110 allowing a user of the television display device 110 to observe a textual representation of an audio signal. In at least some embodiments, the user can view the captioning concurrently during an active telephone call. The captioning can be provided alone or in combination with an aural presentation of the captioned audio signal.

In some embodiments, the system 100 includes a residential gateway 104, as shown, in communication with a first communication device 102 and a set-top box 108. In some embodiments, the system 100 includes a computing device 106 (shown in phantom) also in communication with the residential gateway 104. The residential gateway 104 provides packet switched network connection, e.g., an internet connection, to the computer 160, supporting voice communications, e.g., by way of voice over internet protocol, to the first communication device 102 and a multimedia connection, e.g., internet protocol television, to the set-top box 108.

The set-top box 108 is in further communication with the display device 110, such as a television display. In some embodiments, the system 100 also includes a remote control device 112. The remote control device 112 can be used to control one or more elements of the system 100, such as the set-top box 108 and/or the television display device 110.

The residential gateway 104 is in further communication with a packet-switched network 114, such as a private managed network of a service provider. In the illustrative embodiment, the network 114 is in further communication with a multimedia network, such as an internet protocol television network 116, and a call routing center 122. The internet protocol television network 116 is in communication with one or more video head-end servers 115. The video head-end server(s) 115 provide multimedia content, such as programmed television and video on demand, for delivery over the internet protocol television network 116, for consumption on one or more subscriber devices, such as the television display 110. Other embodiments are available in which the various devices 102, 106, 108 are connected to one or more of the networks 114, 116, 124 without being associated with the residential gateway 104.

The call routing center 122 is in communication with the residential gateway 104 through the private managed network 114 and a circuit switched network, such as a public switched telephone network 124, a mobile communications network, such as a cellular radio communication network (not shown), and the like. Telephone calls originating at or directed to the first communication device 102 can be routed by the private managed network 114 to the call routing center 122, which in turn routes the calls to and from other communication devices, such as a second communication device 128 through the public switched telephone network 124. Alternatively or in addition, telephone calls between the first communication device 102 of a first party and other communication devices of other parties can be routed through the packet-switched network 114, for example, using voice over internet protocol, and over wireless cellular networks, such as GSM and CDMA. Protocols used for telephone call routing, whether circuit switched or message switched, generally include some form of caller identification, such as a telephone number associated with either or both parties engaging in the telephone conversation. Thus, the call routing center can uniquely identify at least one or both of the calling party and the called party by way of the caller identification, e.g., telephone numbers.

In at least some embodiments, the system 100 includes one or more application servers 132 configured to communicate with one or more of the first communication device 102, the set top box 108, and the computing device 106, for example, through the residential gateway 104 and by way of one or more intervening networks, such as the private managed network 114. In the illustrative example, the application server 132 is in communication with the residential gateway 104 through the internet protocol television network 116 and the private managed network 114. In some embodiments, the application server 132 can be in direct communication with one or more of the private managed network 114 and a public network, such as the Internet. The system includes a storage device 134 in communication with the application server 132 to store information usable by the application server 132. It is understood that the storage device 134 can include resident storage within the application server 132, such as an internal hard disk drive, optical disk drive and random access memory (RAM). Alternatively or in addition, the storage device 134 can include network accessible storage, such as provided by a remote storage device, such as a networked storage drive, or a cloud service.

The application server 132 can be used to host one or more application programs, sometimes referred to as "apps" that can be accessed in an interactive manner by one or more of the first communication device 102, the set-top box 108 and the computer 106. For example, the application server 132 can host applications that are accessible by the display device 110 by way of the set-top box 108, providing a viewer with an interactive experience. Examples of some applications include telephone services, allowing viewers to see who is calling by way of a caller identification message displayed on the television display device 110. Such a message might be displayed as a pop-up window, a picture-in-picture, or graphic overlay that can be relatively small in relation to a display area of the television display device 110. In at least some embodiments, such messages are displayed concurrently with other video content, without substantially detracting from presentation of the other video content. A viewer can be notified of an incoming call by way of the television display device 110 and presented with a selectable feature, e.g., an icon, pop-up window, soft-button, or the like, by which the viewer may choose to answer the call by way of the first communication device 102. An example of such an application is the AT&T U-Verse Voice application, provided through U-VERSE, a multimedia service, commercially available from AT&T Knowledge Ventures, L.P., Reno, Nev.

Other applications that can be provided by the application server 132 and similarly accessed in an interactive manner through the television display device 110. By way of example, such apps include a voicemail viewer application that allows a viewer to access voicemail messages from a compatible telephone device, such as a mobile phone or the first communication device 102, or a computing device, such as the computer 106, or a multimedia processing device, such as the set-top box 108. Such a voicemail viewer application can display information to a viewer as a pop-up window, picture-in-picture, or graphic overlay that can be relatively small in relation to a display area and displayed on the display device 110 along with other video content, without substantially detracting from presentation of the other video content. Thus, the viewer may choose to listen to new voicemail messages or previous voicemail messages by selecting a graphical indication of the voicemail messages from a displayed list of messages including one or more of a caller identification, a time and a duration. In at least some embodiments, the audio portion of the voicemail messages can be presented through an audio channel of the television display device 110. According to the techniques disclosed herein, the audio portion of such message can be converted to a textual representation, or caption of the voice mail message for presentation to a user by way of the display device 110. Other features can be provided to allow a viewer to manage messages within a voice mailbox. An example of such an app is the AT&T Voicemail Viewer, provided through the U-VERSE multimedia service.

Examples of other applications that can be provided by the application server 132 and accessed in an interactive manner through the television display device 110 include apps that allow viewers to view photos uploaded to a web service, such as www.flickr.com, by accessing a reserved internet protocol television channel. Other apps can provide weather on demand, or allow a viewer to search for businesses within a definable geographic area through a search interface. The search interface can be presented to a viewer as a pop-up window, picture-in-picture, or graphic overlay that can be relatively small in relation to a display area and displayed on the television display device 110 along with other video content, without substantially detracting from presentation of the other video content.

In the illustrative embodiment, the communications system 100 includes a speech-to-text transformer 130. In at least some embodiments, the speech-to-text transformer 130 is in communication with one or more of the public switched telephone network 124, the call routing center 122, the private managed network, 114 and the application server 132. The speech-to-text transformer 130 can perform a speech-to-text conversion, providing a textual adaptation or interpretation of an audio signal, such as an portion of a telephone call or a pre-recorded audio message as in a voicemail message.

By way of example, at least a portion of audio of a conversation of an active telephone call between a first party at the first communication device 102 and a second party at the second communication device 128 can be routed to the speech-to-text transformer 130. The speech-to-text transformer 130, in turn, receiving audio from at least the second party's second communication device 128, converts the second party's audio signal to text. The text can be forwarded to equipment of the first party, such as the set-top box 108, for example, by way of the application server 132 for presentation on the television display device 110. A displayed presentation of the textual interpretation of the second party's audio signal is referred to as a captions 138 and can be presented to the first party as a pop-up window, picture-in-picture, or graphic overlay of the captions 138 that can be relatively small in relation to a display area and displayed on the display device 110 along with display of other video content 120, without substantially detracting from presentation of the other video content 120.

Other modes of presentation for any of the captions disclosed herein include split screen presentations in which a portion of a viewable area of the display device 110 is dedicated to presentation of the captions. Such split screen presentations can provide a dedicated portion of the screen for captions, e.g., a bottom strip, a top strip, a side strip of the display area. The portion of the display dedicated to presentation of captions can be fixed, or configurable, for example, by way of a user-selectable display area.

As will be described in more detail below, the application server 132 can include a captioning application, or app, that allows a first party to arrange, manage, or otherwise coordinate presentation of textual interpretations of audio signals, such as portions of an active telephone conversation or pre-recorded voicemail messages, on the television display device 110. Thus, a first party, such as a hearing-impaired person, can view the captions 138 in order to more effectively participate in a telephone conversation with a second party, or to review voicemail messages received from the second party. Preferably, such captions are provided regardless of which party initiated the call. Thus, a call placed or otherwise initiated from the first party using the first communication device 102 to the second party using the second communication device 128 will result in presentation of a textual interpretation of an audio signal received from the second communication device 128 of the second party. Likewise, a call placed or otherwise initiated from equipment of the second party to equipment of the first party results in presentation of a textual interpretation of an audio signal received from the communication device 128 of the second party.

The captions can be viewed from the television display device 110 of the first party, allowing for participation in the telephone conversation without the first party having to move their gaze away from other program content 120 also being displayed at the television display device 110. Thus, the first party can continue to watch a favorite television program or video on demand without missing any portion of the program and without having to pause or otherwise interrupt such content as might otherwise detract from the experience of the first party and any other viewers watching the program content 120 together with the first party.

In at least some embodiments, the first party manages features of the speech-to-text transformer 130, or captioning service, through one or more interactive elements of a feature displayable on the display device 110, such as a menu associated with an interactive captioning application. At least some features that can be managed by the first party include one or more of registration for access to speech-to-text transformations of the speech-to-text transformer 130, association of one or more communications devices, e.g., the first communication device 102, with a first party, and association of one or more of the residential gateway 104 and the set-top box 108 with the first party and/or a communications identification of attributable to the first party, for example, of a personal communications device of the first party.

Other features that can be managed by the first party relate to presentation of the captions 138 on the television display device 110. For example, use preferences for one or more of a font style, font size, font color and background color or contrast can be established as default values. In some embodiments, a transparency value can also be provided allowing at least a portion of a displayed program 120 that might otherwise be blocked by the captions 138, to be visible through the captions 138. Other preferences can include one or more of a maximum size of a display area dedicated to presentation of the captions 138. Such a size can be identified by one or more of a percentage of a display area, a display area size, e.g., as in a length and width, or area in inches or centimeters, and an aspect ratio, as in a ratio between the length and width of the presented caption display.

Still other preferences can include a default location for presentation of the display area, such as along a top portion or preferred corner of a display area of the television display device 110. Such preferences allow a call-assisted subscriber to establish a default presentation according to user preferences that will be displayed at an expected location, providing a consistent look and feel. It is understood that although such defaults can be pre-configured, a viewer can be provided with an interactive means to change or otherwise alter such pre-configured defaults either temporarily during a call, or more permanently until subsequently changed.

Still other preferences can include how the speech-to-text transformation is applied. Such preferences can allow for the speech-to-text application to be launched automatically. For example, the application can be launched or otherwise started in response to detection of power-up, e.g., of the set-top box 108, detection of a telephone call (e.g., placement of a call or receipt of a call), detection of receipt of a voicemail message or selection of a voicemail message for playback, or detection of some combination of events, such as power-up of the set-top box 108 during an active telephone conversation including the first communication device 102.

Alternatively or in addition, a user-selectable feature can be presented to the user at the display device 110 in response to an event, such as any of the aforementioned events. The user-selectable feature can include, for example, an icon, text message, or soft button presented on the display device 110. A user can select the user-selectable feature, for example, using a pointing device or a keyboard as can be provided by one or more of a front panel control of the set-top box 108 or the remote control 112. Selection of the user selectable feature causes the captioning application to be run or otherwise activated.

The captioning application can be configured with pre-programmed and/or configurable logic to facilitate presentation of captions. For example, the captioning application can be configured to detect a telephone call event upon activation. Thus, if a user launches, runs or otherwise executes the captioning application, the application can check upon initialization whether a telephone call is active, or being placed or received. In response to detecting the telephone call event, the captioning application can respond according to a pre-programmed or user-configured manner. The response can include automatic captioning of a detected telephone call event, or presentation of a user-selectable feature, such as an icon, that upon selection performs captioning of the detected telephone call.

In some embodiments, a viewer can enter an interactive mode, for example, through an interactive button or switch from the remote control device 112. The interactive mode can introduce a cursor or other suitable pointing icon displayed on the television display device 110. The pointing icon can be positioned or otherwise moved on the display of the television display device 110 under control of the viewer, for example, by using a pointing device or cursor control of the remote control device 112, the computer 106 or the television display device 110. The pointing icon can be used to select other displayed icons, such as soft buttons of menu features that can be displayed in conjunction with the interactive mode.

By way of example, a viewer can select the interactive mode button of the remote control device 112 to launch an interactive mode at the television display device 110. The interactive mode can introduce a menu bar or other suitable graphical presentation of viewer-accessible features, such as the various apps disclosed herein. The graphical presentation of viewer-accessible features can include among other features, the captioning application hosted by the application server 132. The viewer can position the pointing icon over a preferred feature, for example, launching a more detailed list of other features related to a particular application. Thus, selection of a captioning application soft button presented on the television display device 110 can launch or otherwise result in presentation of a more detailed list of features at the display device 110, such as registration, presentation preferences, call preferences, and the like. The viewer can then close or otherwise hide graphical items related to interactive mode, for example, by exiting the interactive mode by selecting a soft button on the display or by another suitable button or switch on the remote control device 112.

Figure 2:
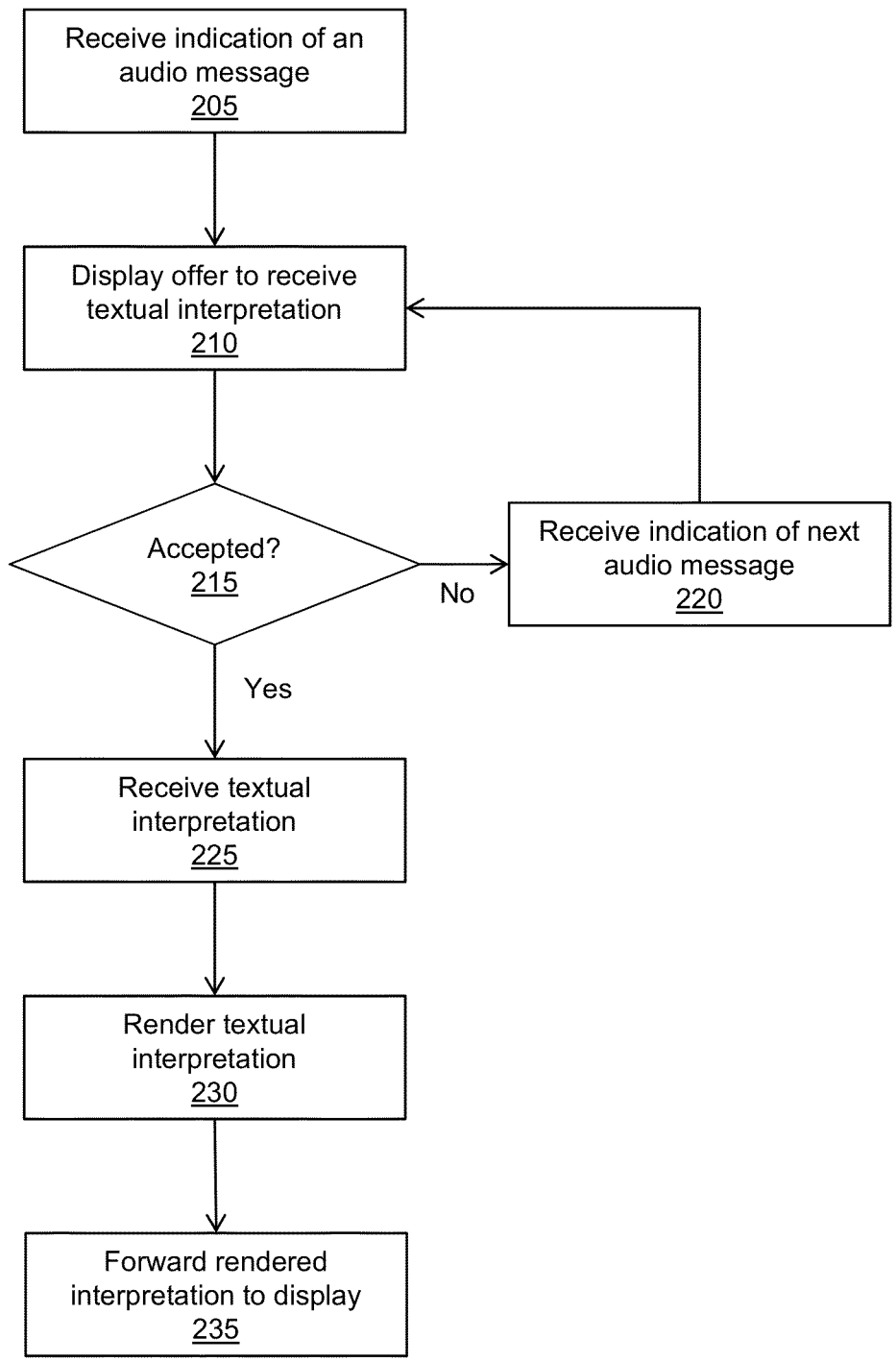
FIGS. 2-3 depict illustrative embodiments of processes that deliver captioned audio on a television display concurrently during a telephone conversation, operating in portions of the systems described in FIGS. 1 and 4-6.

FIG. 2 depicts an illustrative embodiment of a process 200 to deliver a speech-to-text transformation, e.g., captioning, of an audio signal to a television display device 110 (FIG. 1). In particular, the captioned audio provides a textual interpretation of at least a portion of the audio signal. The portion of the audio signal can include audio associated with one of multiple parties participating in an active telephone conversation. For active telephone conversations, the captioning can be displayed concurrently during the active telephone conversation. In at least some embodiments, the captions are presented substantially concurrently with an aural presentation of the audio signal. Such captioned audio can serve hearing impaired, for example, by providing a visual interpretation of audio from another party during an active telephone conversation involving the hearing impaired person. Alternatively or in addition, such captioned audio can serve anyone in an environment, such as a high-ambient noise environment, in which interpretation of audio might be challenging or otherwise impossible.

It should be understood that in any of the captioning scenarios disclosed herein the audio signal subjected to captioning can be forwarded to the first party receiving the captioning to provide the first party with both the audio signal and a captioned version of the audio signal. Alternatively, the audio signal can be blocked or otherwise not routed or otherwise presented to the first party when captions are provided—there may be no need for the audio when captions are provided. Whether the audio is blocked or routed to the first party, can be provided as a default or as a user-selectable option. Thus, a first party, such as a hearing-impaired party, might prefer to receive both the audio and the captioned text, for example, relying on the audio when possible and relying on the captioned text for any portions of the audio that might be difficult or otherwise impossible to understand.

In some embodiments, the process can be implemented in a media processor, such as the set-top box 108 (FIG. 1). The process 200 can include receiving an indication of an audio message, such as a telephone call or a voicemail message, at 205. For example, the set-top box 108 receives an indication that a first party associated with the set-top box 108 by way of a communication identifier, is either receiving or placing a telephone call. The indication of the telephone call can be generated or otherwise forwarded by one or more of the residential gateway 104, the call routing center 122 and the application server 132. For example, the call routing center 122 can be configured to monitor caller identification information for calls that it is routing. In some embodiments, the call routing center 122 can be provided with one or more caller identifications, e.g., telephone numbers, for which speech-to-text transformations may be required. The call routing center 122 can send a message including the call identification associated with a routed call to equipment of the first party associated with the caller identification. For example, the call routing center 122 can send the message to the set-top box 108 associated with the caller identifier, e.g., by way of an IP address of the set-top box 108.

Alternatively, the call routing center 122 can provide the caller identifications of routed calls to the application server 132. In some embodiments, the application server 132 can be configured to compare caller identifiers to a list of call identifiers subscribing to a speech-to-text transformer, sometimes referred to as a captioning service. For those caller identifiers that have registered or otherwise been associated with the speech-to-text transformer 130, the application server 132 can consult an association of caller identifiers with network addresses or other suitable identifiers of associated media processors, such as set-top boxes 108. For example, when the application server 132 receives a caller identifier associated with the first communication device 102, the application server 132 consults an association table 136, database, or other suitable data structure including the association of the communication identifier with an address, e.g., and internet protocol television address, of the set-top box 108 of the first party. The application server 132 can send the indication of a telephone call at 205 to the set-top box 108 by way of the internet protocol television network and/or the private managed network 114 by way of the network address of the set-top box 108.

Call identifiers subscribing to a speech-to-text transformer 130 can include hard-of-hearing individual who have been authorized or otherwise verified to receive captioning services, as may be required for third-party, operator assisted captioning services. Alternatively or in addition, call identifiers subscribing to a speech-to-text transformer 130 can include individuals who have subscribed to a service provider text-to-speech feature. This can include anyone, without limitation, other than fulfilling a subscription to the service. For example, subscription may be subject to additional fees for service.

An offer is presented to a display device of the first party to receive captions at 210. The set-top box 108 is associated or otherwise connected to a display device, such as the television display device 110. A graphical representation of the offer, such as a text message can be rendered by the set-top box 108 and forwarded to the television display device 110 for display thereon. The graphical representation of the offer can be displayed, for example, as a pop-up window or other screen overlay notifying a viewer as to the opportunity to receive captioned text associated with an audio signal, such as an active telephone call or voicemail message.

The first party can choose to accept or reject the offer. In at least some embodiments, such a choice can be made using an interactive application presented at the television display device 110. For example, a viewer, such as the first party engaging in the active call by way of the first communication device 102, can enter a selection indicating acceptance or rejection of the offer. Such a selection can be made by way of a button or switch, e.g., "Enter," of the remote control 112 and/or selection of a soft key presented on the television display device 110. Such a soft key can be presented in combination with an interactive caller ID application. To the extent that the first party rejects the offer at 215, the process 200 continues until an indication of another telephone call is received at 220. Once again, another offer is presented on the display of the first party regarding captions at 210.

To the extent that the first party accepts any of the offers presented at 210, a textual interpretation of at least a portion of an audio signal, such as an active telephone conversation or a voicemail message is received at 225. For example, the application server 132 can receive an indication that the first party has selected or otherwise made known a preference to receive the captioned text. It should be understood that although the illustrative example includes the presentation of an offer to engage in speech-to-text transformations on a call-by-call basis, such preferences can be provided by way of a default value. Such default values might include all calls involving the first party, all calls involving the communication identifier associated with the first communication device 102 of the first party, or one or more other parties as may be identified by an address book entry and/or a corresponding caller identifier of the second communication device 128.

In some embodiments, the offer 210 and acceptance 215 can be implemented during a configuration phase, such that subsequent receipt of audio messages 205 is handled at 215 according to the prior selection made at 215. For example, there is no need to display an offer at 210 and accept a response at 215 if during configuration the first party chooses to accept all phone calls, or calls from certain parties, such as designated parties or parties in an address book.

Any of the text-to-speech features disclosed herein can be combined with one or more additional features. By way of example, text-to-speech features can be combined with a call waiting feature. A first user engaged in an active telephone conversation with a second party may receive a call from a third party. The first party is notified of the incoming call by one or more of an audio indication and a visual indication. The visual indication can include a graphical indication presented to the first user by way of a graphical user interface at the television display device 110. A graphical item, such as a menu item, soft button, text or other suitable icon is presented indicating the second call from the third party. The graphical item can include a caller ID of the third party along with a soft button or other suitable icon to allow by selection thereof, the first party to place the current call to the second party on hold, while answering the incoming call. Closed captioning of an audio signal from the third party can be displayed to the first user, by selection of a menu item, soft key or icon to answer the call.

The textual interpretation is rendered or otherwise prepared for graphical display at 230. The set-top box 108 generally receives one or more digital multimedia signals associated with programmed channels and/or video on demand content and provides corresponding video streams to the television display device 110. The caption text can be received in any suitable format, ranging from ASCII text to a video signal providing a graphical rendition of the captioned audio. To the extent the received caption text is not suitable for presentation on the display device, the set-top box 108 can render a graphical image including a separate video signal, e.g., for a picture-in-picture presentation, or modified a video version of the program video signal to include the graphical presentation of the caption text, for example, as an overlay as in a watermark or banner.

Rendering of the graphical presentation of the caption text can be subject to one or more preselected and/or default features. For example, parameters of the rendered version of the textual interpretation can be subject to one or more parameters controlling presentation of the captioned text, such as font style, font size, font color, background color, contrast, location, caption window display size, and the like. Parameters controlling one or more such features can be provided by default values, user selected values, or combinations of default and user adjusted values. Although the example discloses such rendering occurring at the set-top box 108, it is understood that some or all of such rendering can be produced by other elements of the system 100, such as the application server 132. The rendered textual interpretations, whether generated at the set-top box 108 or received from the application server 132, are forwarded to the television display device 110 of the first party at 230. For example, the separate or modified video signal can be forwarded from the set-top box 108 to the display device 110.

Figure 3:
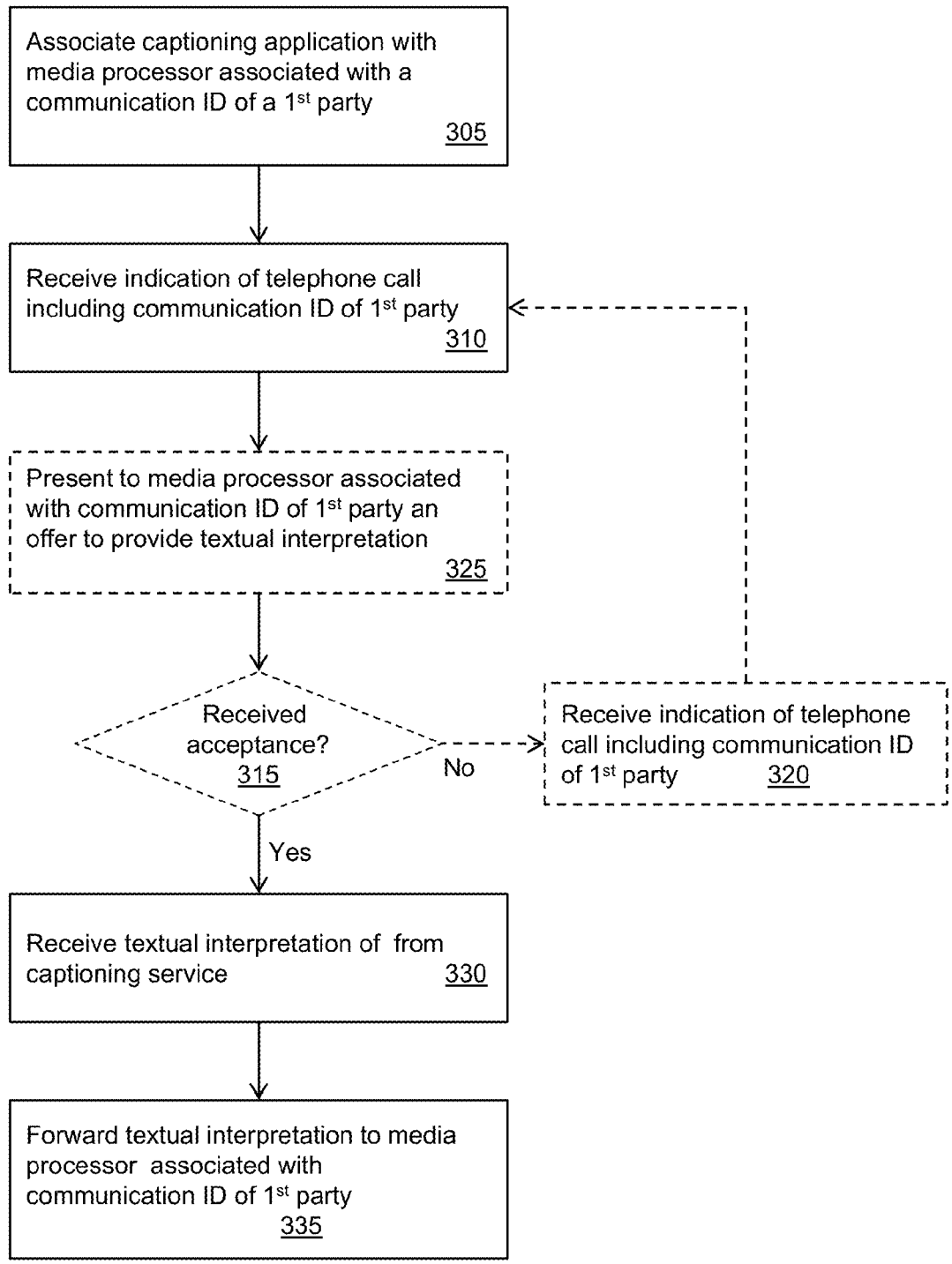

FIG. 3 depicts an illustrative embodiment of another process 300 that delivers captioned audio on a television display concurrently during a telephone conversation. The process includes associating a captioning application with a media processor associated with a communication identifier of a first party at 305. In at least some embodiments, such a process 300 can be implemented from an application server, such as the application server 132 of the system 100 (FIG. 1). The set-top box 108 can be configured to present an interactive experience by way of the television display device 110, for example, allowing viewers to access interactive applications, such as those applications disclosed herein, including an application to receive captioned text associated with active telephone calls. The applications can be accessed at one or more remote servers through a network, such as a uniform resource locator or other suitable world-wide-web address. In the illustrative example, the application server 132 is accessible through one or more of the private managed network 114 and the internet protocol television network 116.

An indication of an active telephone call or initiation of a telephone call is received at 310. The indication of the active call or initiation in advance of the active call can be received, for example, by a call routing service, such as that provided by the call routing center 122 disclosed herein. In some embodiments, an offer is presented, when activated, to a first party for speech-to-text transformations providing a textual interpretation of at least a portion of the active telephone call or call initiated call at 325 (shown in phantom). The offer can be forwarded by the application server 132 to a media processor, such as the set-top box 108 associated with a communication identifier, such as a telephone number of a first communication device 102 of the first party.

To the extent that the first party rejects the offer at 315 (shown in phantom), the process 300 continues until an indication of another telephone call is received at 320 (also shown in phantom). Once again, an indication of another active telephone call, or initiation of another telephone call is received, e.g., at the application server, at 310. Another offer to a first party for reception of a textual interpretation of at least a portion of the other active telephone call or call initiated call, when activated, is presented at 325. To the extent that an indication that the first party has accepted any of the offers presented at 325 and at 320, a textual interpretation of at least a portion of an active telephone conversation is received at 325. The textual interpretation is forwarded to the media processor, such as the set-top box 108 associated with the call identifier of the first party at 335.

In some embodiments, the process 300 is preconfigured to receive the textual interpretation from the speech-to-text transformer at 330 and to forward the textual interpretation to the media processor, such as the set-top box 108 at 335 without presentation of the offer at 325 and acceptance of the offer at 315. Such preconfiguration can be established by a default setting, a user-adjustable setting, or a combination of default settings and user-adjustable settings. For example, a first party having a caller identification of a first communication device 102 associated with a set-top box 108 can preconfigure a captioning application hosted at an application server 132 to provide captioning at the television display device 110, by way of the set-top box 108, for every active telephone call. Alternatively, the first party can preconfigure the captioning application to provide captioning at the television display device 110 only for those calls to a selected group of other parties. Such selection can be accomplished according to a selectable setting associated with entries of the first party's address book.

The speech-to-text transformer 130 can be provided by an operator-assisted relay service, of the type described in U.S. Pat. No. 6,233,314, incorporated herein by reference in its entirety, among others, and currently commercially available under the name CAPTEL relay from Ultratech of Madison, Wis. For example, an operator at the speech-to-text transformer 130 receives an audio signal of speech of a party at the second communication device 128 of an active call with a call-assisted party at the first communication device 102. The operator re-voices the received audio signal to a speech-to-text application, such as DRAGON speech-to-text application, commercially available from Nuance of Burlington, Mass. It is common for third-party captioning services to require a verification that an individual is qualified to receive such services. Verifications can include a requirement that a user attest to being diagnosed as hard of hearing or deaf to meet Federal Communications Commission (FCC) guidelines as they relate to disability laws.

In at least some embodiments, the speech-to-text transformer 130 can be provided by an automated process, without a need for an operator-assisted service. For example, the speech-to-text transformer can include a speech-to-text application adapted to receive an audio signal. The audio signal can be an audio signal of at least one of the first and second parties engaging in an active telephone conversation. Alternatively or in addition, the audio signal can include audio from another application, such as a voicemail application. The audio can include audio of a voicemail message. At least one benefit of using an automated process without a third-party intervention is that a verification requirement is not necessarily required. Thus, benefits offered by speech-to-text captioning can be enjoyed by anyone, not strictly those hard of hearing. For example, such services can be beneficial to anyone in a high ambient noise environment.

When the speech-to-text transformer 130 is implemented without operator assistance, the speech-to-text application of the transformer 130 can be included whole or in part among one or more of a dedicated server or a shared server, such as the application server 132, the residential gateway 104, the set-top box 108, the first communication device 102, and the display device 110.

Figure 4:
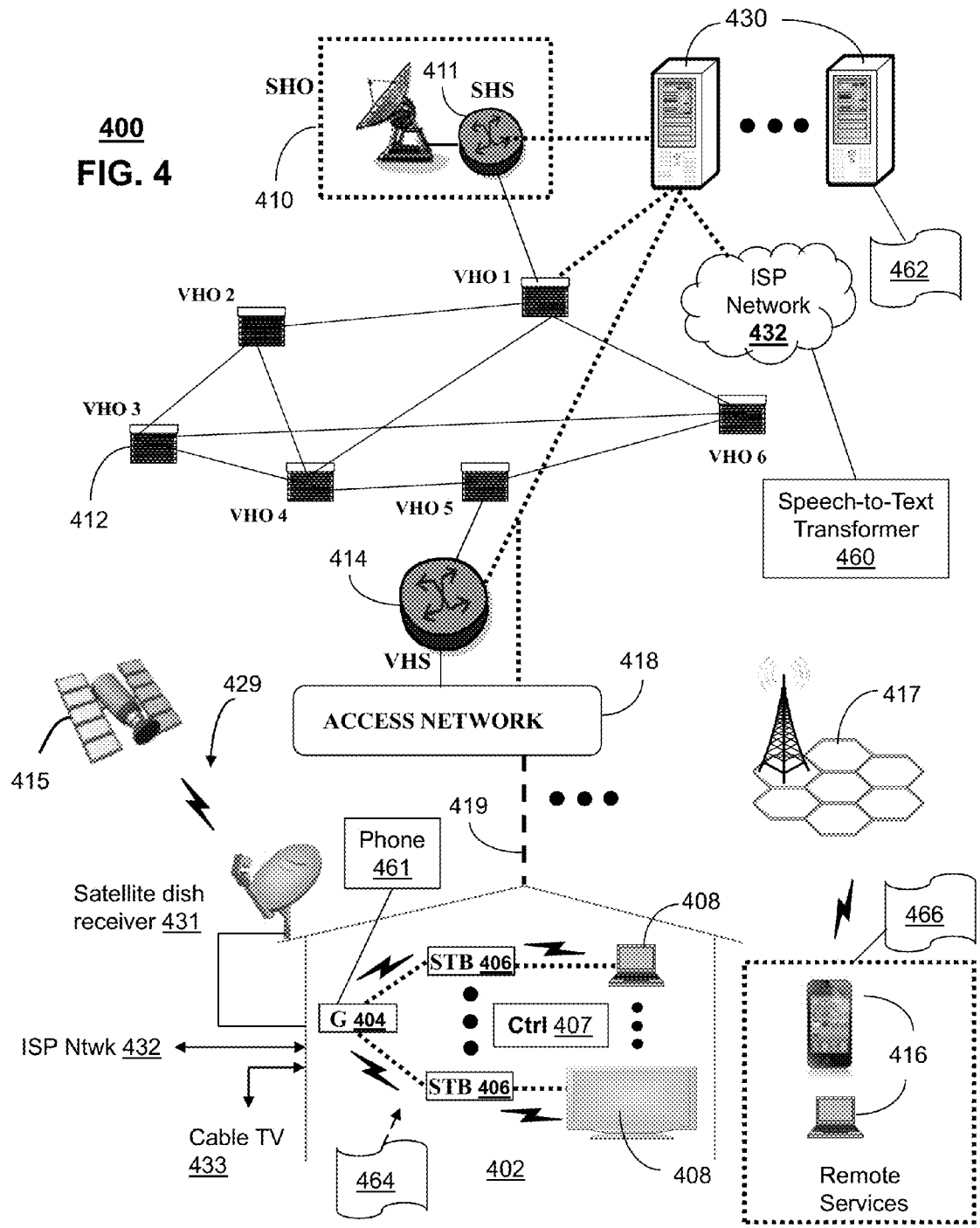
FIGS. 4-5 depict illustrative embodiments of communication systems that provide media services.

FIG. 4 depicts an illustrative embodiment of a first communications system 400 for delivering media content. The communications system 400 can represent an Internet Protocol Television (IPTV) media system. Communications system 400 can be overlaid or operably coupled with the system 100 of FIG. 1 as another representative embodiment of communications system 400. For example, a textual interpretation of an audio signal generated by equipment of a second party is received during an active telephone call between a first party and the second party. The textual interpretation of the audio signal can be received from an application server 132 (FIG. 1) rendering a graphical image of the textual interpretation of the audio signal generated during the active telephone call by the equipment of the second party. The rendered graphical image can be presented to a display device, such as the television display terminal 110 (FIG. 1) associated with a caller identification of the first party.

The IPTV media system can include a super head-end office (SHO) 410 with at least one super head-end office server (SHS) 411 which receives media content from satellite and/or terrestrial communications systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communications protocol.

The VHS 414 can distribute multimedia broadcast content via an access network 418 to commercial and/or residential buildings 402 housing a gateway 404 (such as a residential or commercial gateway). By way of non-limiting example, the access network 418 can represent a group of digital subscriber line access multiplexers (DSLAMs) located in a central office or a service area interface that provide broadband services over fiber optical links or copper twisted pairs 419 to buildings 402. The gateway 404 can use communications technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communications technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as videoon-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communications system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communications system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communications devices 416.

The communications system 400 can also provide for all or a portion of the computing devices 430 to function as an interactive television application server (herein referred to as the application server 430). The application server 430 can use computing and communications technology to perform the captioning function 462, which can include among other features, receiving textual interpretation of an audio signal including voice of a second party engaged in an active telephone conversation with a first party at a communications device, such as the telephone 461 in communication with the residential gateway 404. The audio of the second party can be routed to a speech-to-text transformer 460 which translates the audio into a textual caption. The caption can, in turn, be forwarded to the captioning application at the application server 430 by way of the ISP network 432 or other any suitable means. The application server 430, in turn, provides speech-to-text transformation to the media processor 406, by way of the residential gateway 404. The media processor 406, in turn, presents a graphical representation of the captioned text to the television display device 408. The media processors 406 and wireless communications devices 416 can be provisioned with software functions 464 and 466, respectively, to utilize the services of the application server 430. The software function 464 can implement any one or more of the features disclosed herein in relation to a media processor or set-top box 406. The software function 466 can implement any one or more features disclosed herein in relation to the residential gateway 404, the set-top box 406, the communications device 461 and the remote control 407.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
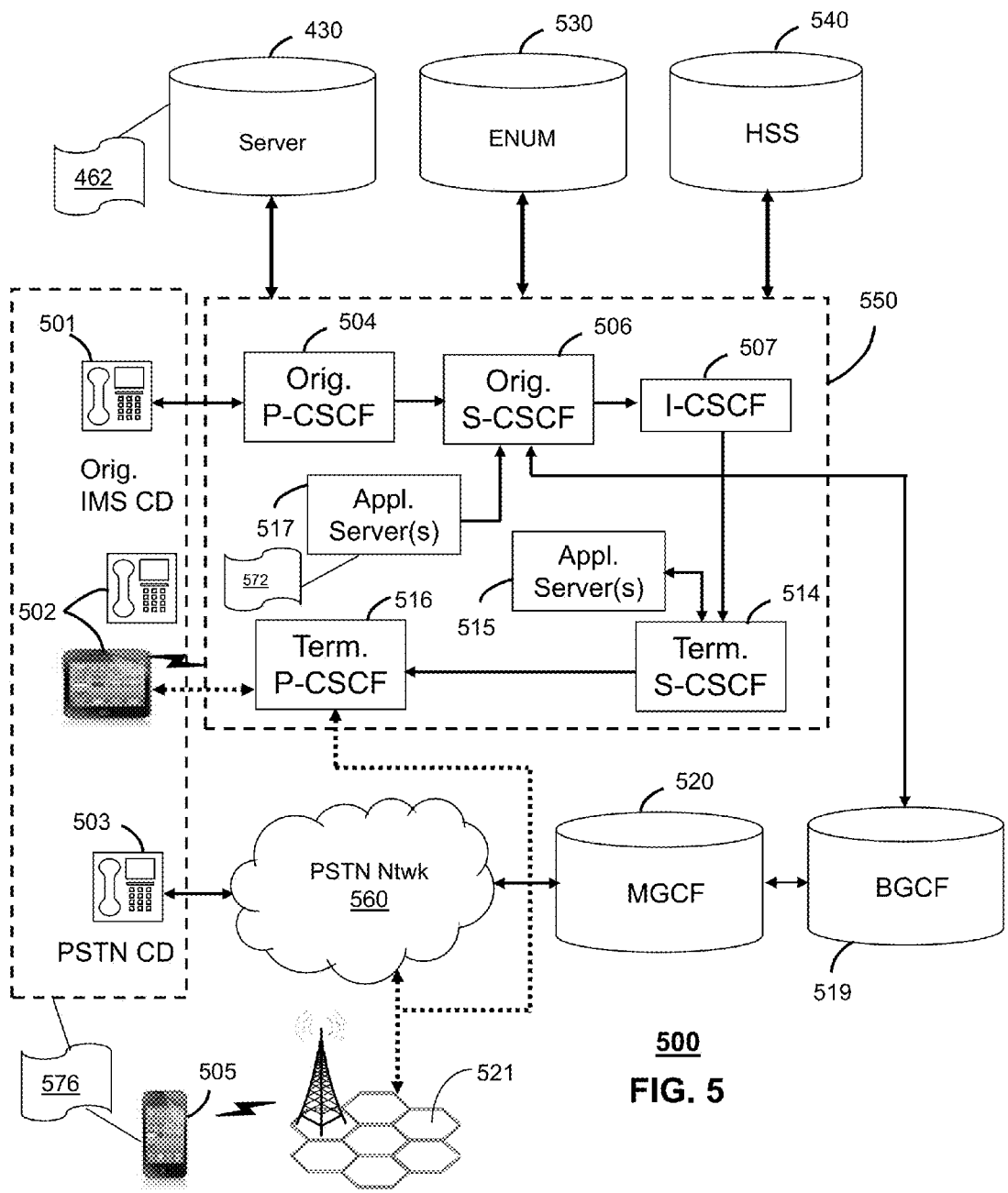

FIG. 5 depicts an illustrative embodiment of a communications system 500 employing an Internet Protocol Multimedia Subsystem (IMS) network architecture to facilitate the combined services of circuit-switched and packet-switched systems. Communications system 500 can be overlaid or operably coupled with the system 100 of FIG. 1 and the communications system 400 of FIG. 4 as another representative embodiment of a communications system 500. For example, a textual interpretation of an audio signal generated by equipment of a second party, is received during an active telephone call between a first party and the second party. The textual interpretation of the audio signal can be received from an application server 132, 430 rendering a graphical image of the textual interpretation of the audio signal generated during the active telephone call by the equipment of the second party. The rendered graphical image can be presented to a display device, such as the television display terminal 110, 408 associated with a caller identification of the first party.

Communications system 500 can comprise a Home Subscriber Server (HSS) 540, a tElephone NUmber Mapping (ENUM) server 530, and other network elements of an IMS network 550. The IMS network 550 can establish communications between IMS-compliant communications devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communications session involves IMS CD to IMS CD communications. A communications session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communications process is symmetrical. Accordingly, the terms "originating" and "terminating" in FIG. 5 may be interchangeable. It is further noted that communications system 500 can be adapted to support video conferencing. In addition, communications system 500 can be adapted to provide the IMS CDs 501, 502 with the multimedia and Internet services of communications system 400 of FIG. 4.

If the terminating communications device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communications technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The interactive television application server 430 of FIG. 4 can be operably coupled to the second communications system 500 for purposes similar to those described above. The application server 430 can perform function 462 and thereby provide speech-to-text transformations to the set top box 108 (FIG. 1). The function 462 can allow for operation or management of such speech-to-text transformations by one or more of the remote control 112, 407, the remote services 416 and CDs 501, 502, 503 and 505 of FIG. 5. The CDs 501, 502, 503 and 505, which can be adapted with software to perform function 572 to utilize the services of the application server 430. The application server 430 can be an integral part of the application server(s) 517 performing function 572, which can be substantially similar to function 462 and adapted to the operations of speech-to-text transformations over the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
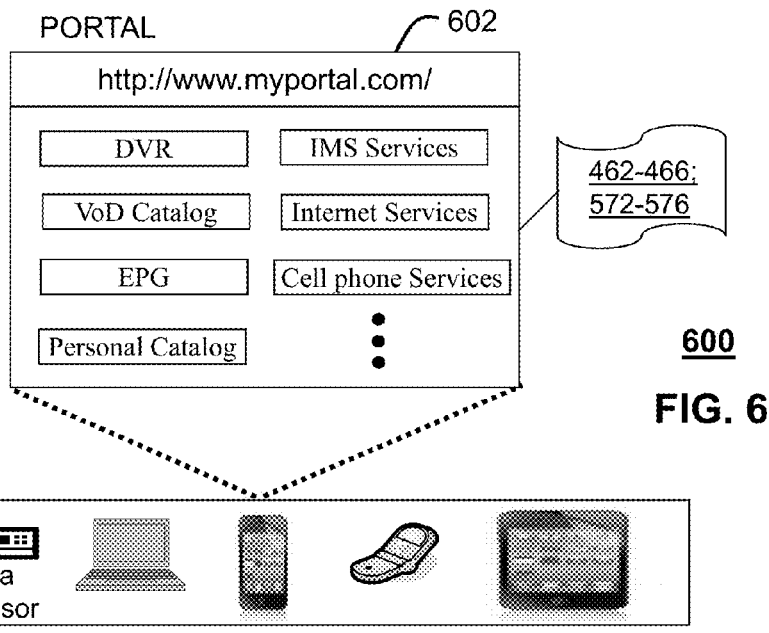
FIG. 6 depicts an illustrative embodiment of a web portal for interacting with the communication systems of FIGS. 4-5.

FIG. 6 depicts an illustrative embodiment of a web portal 602 which can be hosted by server applications operating from the computing devices, including the application server 132 of the system 100 illustrated in FIG. 1. Communications system 600 can be overlaid or operably coupled with system 200, communications 400, and/or communications system 500 as another representative embodiment of the system 100 of FIG. 1, the communications system 400 of FIG. 4, and/or communications system 500 of FIG. 5. For example, a textual interpretation of an audio signal, such as an audio signal of a voicemail message of a voicemail messaging system, or an audio signal generated by equipment of a second party, is received during an active telephone call between a first party and the second party. The textual interpretation of the audio signal can be received from an application server 132, 430 rendering a graphical image of the textual interpretation of the audio signal generated during the active telephone call by the equipment of the second party. The rendered graphical image can be presented to a display device, such as the television display terminal 110, 408 associated with a caller identification of the first party.

The web portal 602 can be used for managing services of communications systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communications device such as those described in FIGS. 1-2. The web portal 602 can be configured, for example, to access a media processor 108 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 108. The web portal 602 can also be used for provisioning IMS services described earlier, provisioning Internet services, provisioning cellular phone services, and so on.

The web portal 602 can further be utilized to manage and provision software applications 462-466, and 572-576 to adapt these applications as may be desired by subscribers and service providers of communications systems 400-500.

Figure 7:
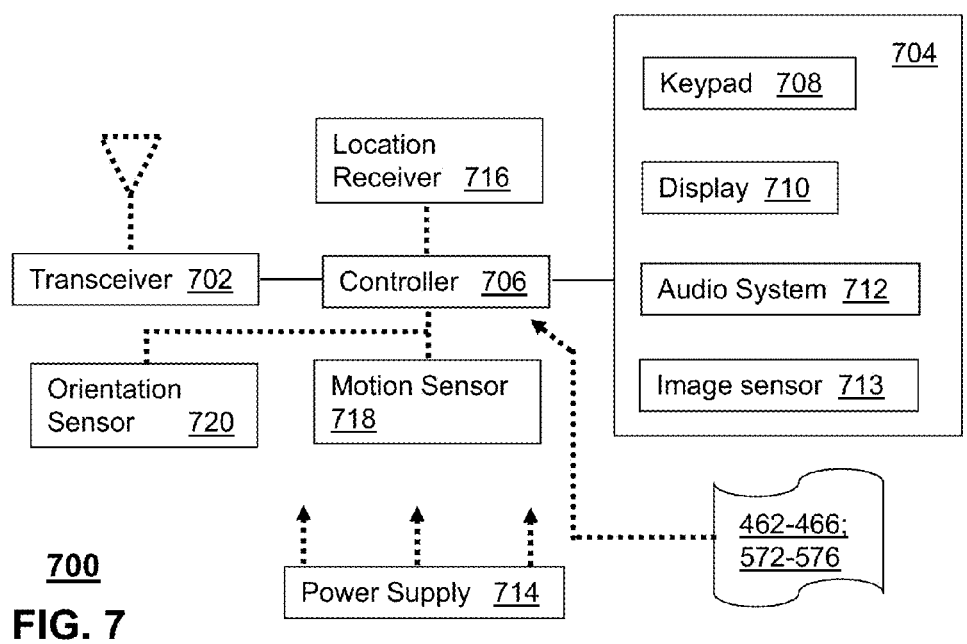
FIG. 7 depicts an illustrative embodiment of a communication device.

FIG. 7 depicts an illustrative embodiment of a communications device 700. Communications device 700 can serve in whole or in part as an illustrative embodiment of the devices depicted in FIGS. 4-5. For example, a textual interpretation of user equipment capable of generating and/or receiving an audio signal. For example, an audio signal can include an audio signal of a second party is received during an active telephone call between a first party and the second party. The textual interpretation of the audio signal can be received from an application server 132, 430 rendering a graphical image of the textual interpretation of the audio signal generated during the active telephone call by the equipment of the second party. The rendered graphical image can be presented to a display device, such as the television display terminal 110, 408 associated with a caller identification of the first party.

To enable features related to the delivery of speech-to-text transformations to a television display, communications device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communications technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communications technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communications device 700. The keypad 708 can be an integral part of a housing assembly of the communications device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communications device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communications device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communications device 400 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communications device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communications device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communications device 700 in three-dimensional space. The orientation sensor 720 can utilize orientation sensing technology such as a magnetometer to detect the orientation of the communications device 700 (north, south, west, and east, as well as combined orientations in degrees, minutes, or other suitable orientation metrics).

The communications device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communications device 400.

Other components not shown in FIG. 7 can be used in one or more embodiments of the subject disclosure. For instance, the communications device 700 can include a reset button (not shown). The reset button can be used to reset the controller 706 of the communications device 700. In yet another embodiment, the communications device 700 can also include a factory default setting button positioned, for example, below a small hole in a housing assembly of the communications device 700 to force the communications device 700 to re-establish factory settings. In this embodiment, a user can use a protruding object such as a pen or paper clip tip to reach into the hole and depress the default setting button. The communications device 400 can also include a slot for adding or removing an identity module such as a Subscriber Identity Module (SIM) card. SIM cards can be used for identifying subscriber services, executing programs, storing subscriber data, and so forth.

The communications device 700 as described herein can operate with more or less of the circuit components shown in FIG. 7. These variant embodiments can be used in one or more embodiments of the subject disclosure.

The communications device 700 can be adapted to perform the functions of the media processor 406, the media devices 408, or the portable communications devices 416 of FIG. 4, as well as the IMS CDs 501-502 and PSTN CDs 503-505 of FIG. 5. It will be appreciated that the communications device 700 can also represent other devices that can operate in communications systems 400-500 of FIGS. 4-5 such as a gaming console and a media player.

The communications device 700 shown in FIG. 7 or portions thereof can serve as a representation of one or more of the devices of the system 100 of FIG. 1, communications system 400 of FIG. 4, and communications system 500 of FIG. 5. In addition, the controller 706 can be adapted in various embodiments to perform one or more of the functions 462-462 and 572-572, respectively.

Upon reviewing the aforementioned embodiments, it would be evident to an artisan with ordinary skill in the art that said embodiments can be modified, reduced, or enhanced without departing from the scope of the claims described below. For example, a speech to text application suitable for operation without the assistance of an operator can be implemented in one or more of the system components, such as the set-top box 108, 406, the residential gateway 104, 404 and the application server 132, 430 or a separately hosted service, for example, accessible over one or more of the networks 114, 116, 124. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
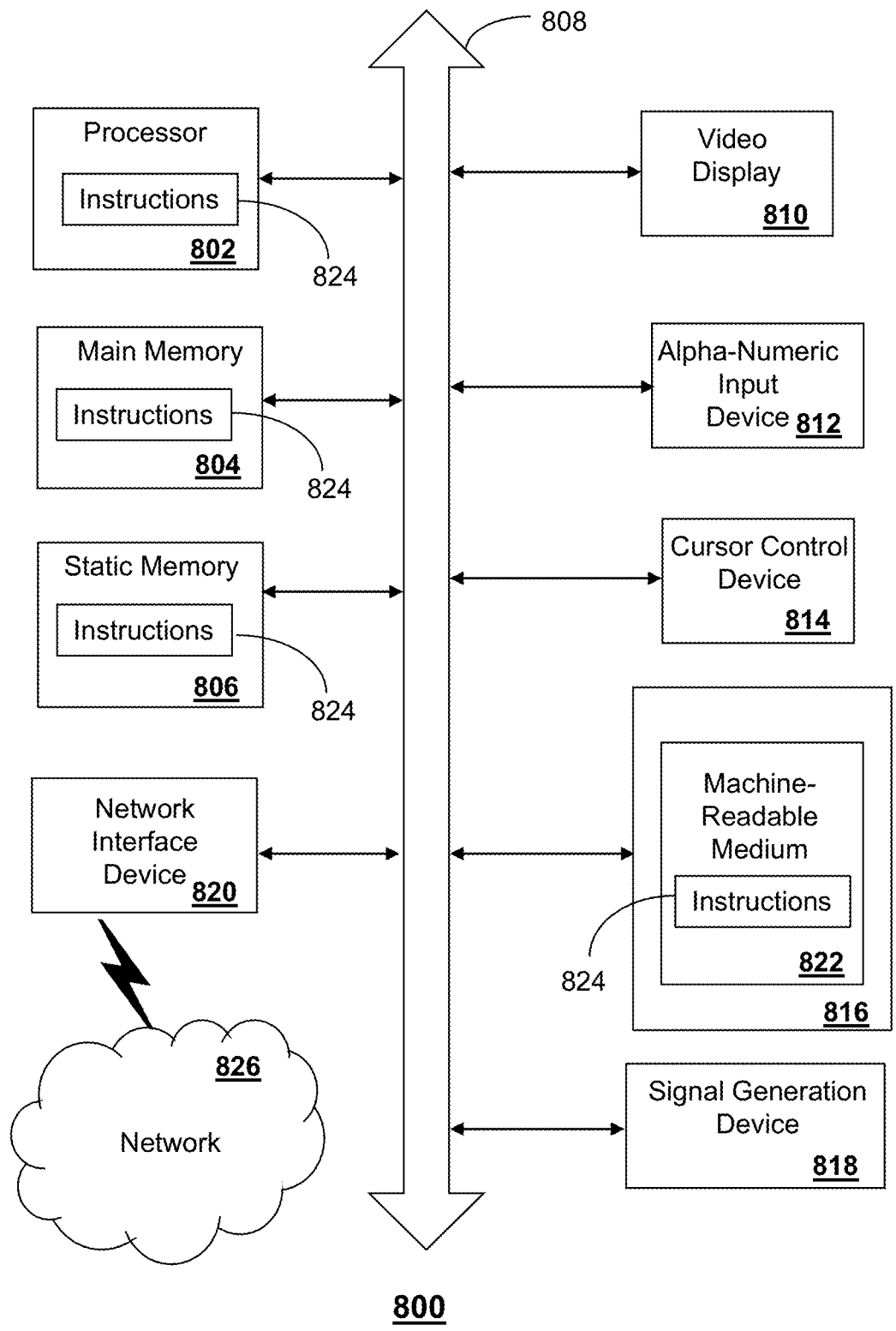
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the application server 132, 430, the residential gateway 104, the set-top box 108, the media processor 406 and other devices of FIGS. 1 and 4-6. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communications device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a system including a processor, an indication of an audio signal associated with an active telephone conversation;
presenting, by the system, at a television display associated with a first party an offer to receive a textual interpretation of the audio signal;
receiving, by the system, in response to an acceptance of the offer, the textual interpretation of the audio signal, wherein the textual interpretation of the audio signal is received from an application server;
rendering, by the system, a graphical image of the textual interpretation of the audio signal;
accessing, by the system, a user preference associated with a feature of the graphical image of the textual interpretation of the audio signal;
presenting, by the system, at the television display, media content that is received from a content source; and
presenting, by the system, at the television display, the graphical image of the textual interpretation of the audio signal while the active telephone conversation is occurring, wherein the graphical image of the textual interpretation of the audio signal is presented as an overlay of the media content that is being presented, and wherein the graphical image is presented according to the user preference.

2. The method of claim 1, wherein the feature of the graphical image comprises a transparency value associated a degree to which the graphical image of the textual interpretation blocks visibility of the media content that is being presented.

3. The method of claim 2, wherein the feature of the graphical image further comprises a relative location on the television display for the presenting of the graphical image at the television display.

4. The method of claim 2, further comprising receiving, by the system, the user preference associated with the feature of the graphical image.

5. The method of claim 4, further comprising presenting, by the system, a user-selectable feature at the television display responsive to the receiving of the indication of an audio signal, wherein the user-selectable feature is associated with the receiving of the user preference.

6. The method of claim 5, wherein the user-selectable feature comprises an icon, a soft button, or a combination thereof that are presented at the television display.

7. The method of claim 1, wherein the textual interpretation of the audio signal further comprises an audio signal of a voicemail message.

8. A media processing device comprising:
a memory to store computer instructions; and
a processor coupled to the memory, wherein the processor, responsive to executing the computer instructions, performs operations comprising:
receiving, during an active telephone call between a first party and a second party, a textual interpretation of an audio signal associated with the active telephone call and that is generated by equipment of the second party, wherein the textual interpretation of the audio signal is received from an application server;
rendering a graphical image of the textual interpretation of the audio signal generated during the active telephone call by the equipment of the second party;
accessing a user preference associated with a feature of the graphical image of the textual interpretation of the audio signal;
presenting, at a television display, media content that is received from a content source; and
presenting at the television display that is associated with a caller identification of the first party, the graphical image of the textual interpretation of the audio signal while the active telephone call by the equipment of the second party is occurring, wherein the graphical image of the textual interpretation of the audio signal is presented as an overlay of the media content that is being presented, and wherein the graphical image is presented according to the user preference.

9. The media processing device of claim 8, wherein the processor, responsive to executing the computer instructions, performs operations further comprising presenting to the television display an offer for presenting the textual interpretation of an audio signal generated during the active telephone call, wherein the rendering of the graphical image of the textual interpretation of the audio signal and the presenting to the television display the graphical image of the textual interpretation are responsive to an acceptance of the offer.

10. The media processing device of claim 9, wherein the processor, responsive to executing the computer instructions, performs operations further comprising receiving an indication of a caller identification of the second party, wherein the presenting to the television display the offer for presenting the textual interpretation of an audio signal generated during the telephone call is presented in response to the indication of the caller identification of the second party.

11. The media processing device of claim 10, wherein the presenting of the offer comprises rendering a selectable graphical icon and presenting the selectable graphical icon to the television display.

12. The media processing device of claim 8, wherein the operations further comprise receiving the user preference associated with the feature of the graphical image.

13. The media processing device of claim 12, wherein the processor, responsive to executing the computer instructions, performs operations further comprising presenting a user-selectable feature at the television display responsive to the receiving of the textual interpretation of the audio signal, wherein the user-selectable feature is associated with the receiving of the user preference.

14. The media processing device of claim 8, wherein the feature comprises one of font style; font size; font color; background color; location; number of displayed lines; number of displayed characters; or any combinations thereof.

15. A non-transitory computer-readable storage medium, comprising computer instructions which, responsive to being executed by a processor, cause the processor to perform operations comprising:

receiving, during an active telephone call between a first party and a second party, a textual interpretation of an audio signal associated with the active telephone call that is generated by equipment of the second party, wherein the textual interpretation of the audio signal is received from an application server;

rendering a graphical image of the textual interpretation of the audio signal that is generated during the active telephone call by the equipment of the second party;

accessing a user preference associated with a feature of the graphical image of the textual interpretation of the audio signal;

presenting, at a television display, media content that is received from a content source; and presenting to a display device associated with a caller identification the first party, the graphical image of the textual interpretation of the audio signal that is associated with the active telephone call by the equipment of the second party while the active telephone call is occurring, wherein the graphical image of the textual interpretation of the audio signal is presented as an overlay of the media content that is being presented, and wherein the graphical image is presented according to the user preference.

16. The non-transitory computer-readable storage medium of claim 15, wherein rendering a graphical image of the textual interpretation of the audio signal generated during the active telephone call comprises rendering a graphical image for presentation as a picture-in-picture for display with other video content.

17. The non-transitory computer-readable storage medium of claim 15, wherein rendering a graphical image of the textual interpretation of the audio signal generated during the active telephone call comprises rendering a graphical image in combination with other video content for presentation as an overlay for display with the other video content.

18. The non-transitory computer-readable storage medium of claim 15, wherein the textual interpretation of the audio signal generated during the telephone call is received from a network-accessible translation service.

19. The non-transitory computer-readable storage medium of claim 15, comprising computer instructions which when executed by processor cause the processor to perform operations comprising receiving of the user preference associated with the feature of the graphical image of the textual interpretation, wherein rendering the graphical image of the textual interpretation includes the feature of the graphical image.

20. The non-transitory computer-readable storage medium of claim 19, wherein the feature comprises one of: font style; font size; font color; background color; location; number of displayed lines; number of displayed characters; or any combinations thereof.

* * * * *